Sept. 5, 1939.    H. W. KOST    2,172,247

FASTENING DEVICE

Filed March 12, 1937

Inventor
Harold W. Kost

By Strauch & Hoffman
Attorneys

Patented Sept. 5, 1939

2,172,247

UNITED STATES PATENT OFFICE 2,172,247

FASTENING DEVICE

Harold W. Kost, Detroit, Mich., assignor to Prestole Devices, Inc., Detroit, Mich., a corporation of Michigan Application March 12, 1937, Serial No. 130,593

8 Claims. (Cl. 189—36)

The present invention relates to a fastening device intended to adapt a sheet metal structure for the reception of a screw, either for the purpose of securing said structure to another structure or for the purpose of securing another structure to the structure containing the fastening device.

More particularly, the invention is concerned with a fastening device that provides the thread for engagement by the screw and that is capable of being readily applied to a sheet metal structure so as to become a rigid part thereof with the thread in proper position for the reception of a screw.

It is frequently desirable to engage a screw or bolt with a sheet metal structure that is so thin that it is impracticable to either form the screw thread from the portion of the metal surrounding the opening provided for the passage of the fastener or by the formation of fine threads cut in the wall of said opening. Under these conditions it has been customary in the past to weld nuts or the equivalent thereof to the sheet metal to provide added thickness at the points at which the threaded fasteners are to be engaged therewith. This arrangement is not satisfactory, not only because it is expensive, but because no means is provided for preventing movement of the screw in the nuts or the like, such movement producing looseness at the point of connection and eventual disengagement of the screw.

The primary purpose of the present invention is to provide a fastening device which may be constructed of heavier metal than the structure to which it is applied, and which is so constructed that it may be firmly secured to the structure with a self-locking thread formed as a part thereof in proper position for the reception of the shank of a threaded fastener.

A further object of the invention is to provide a fastening device having a self-locking thread in the form of a strip designed to be engaged with a sheet metal structure by means of an operation analogous to the operation of a sliding latch.

A still further object of the invention is to provide an improved sheet metal structure adapted to receive a threaded fastener, the structure being adapted for this purpose by sliding a strip of metal having a fastener receiving opening, the wall of which forms a self-locking thread through a pair of slits in said structure, the walls of the slit serving to support said strip at both ends.

A still further object of the invention is to provide an improved sheet metal structure designed to receive a fastening device, the improvements in said structure consisting in the bossing of a portion thereof and the provision of a pair of slits adjacent the margins of the embossment or debossment.

A still further object of the invention is to provide an improved method of providing a sheet metal structure with a thread for a screw consisting of a series of simple and inexpensive steps that provide the sheet metal structure with a self-locking thread of great strength.

Further objects of the invention will appear as a description thereof proceeds with reference to the accompanying drawing in which.

Like reference characters indicate like parts throughout the several figures.

Figure 1:
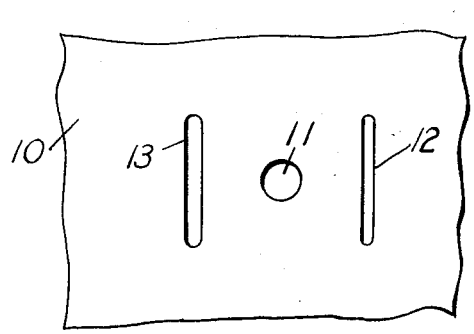
Figure 1 is a plan view of a sheet metal structure provided with the necessary openings punched therein for the application thereto of the fastening device and the threaded fastener.
Figure 2:
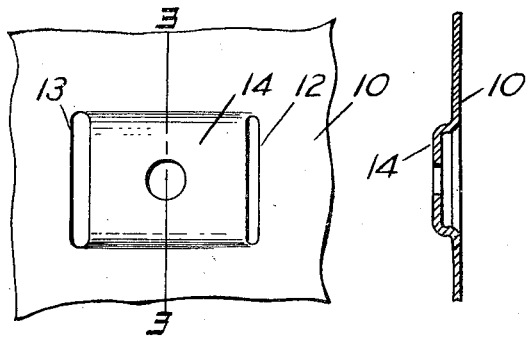
Figure 2 is a fragmental view similar to Figure 1, but showing the portion of the sheet metal structure, bossed to bring it into the form necessary for the reception of the fastening device.
Figure 3:
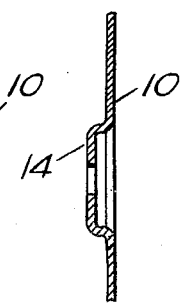
Figure 3 is a sectional view taken on the plane indicated by the line 3—3 in Figure 2.

The sheet metal structure 10 may be part of an automobile body, for example, to which it is desired to attach a fender or any other part by means of a threaded fastener such as a bolt. In adapting said structure for the fastening device presently to be referred to, it is provided with an opening 11 for the passage of the shank of a threaded fastener. The opening 11 is made of sufficient size so that its diameter exceeds the maximum diameter of the threaded shank, that is, so that said shank may pass freely therethrough without engagement with the wall of the opening. Structure 10 is further provided with slits 12 and 13 disposed at opposite sides of the opening 11. Preferably the slit 13 is wider than the slit 12 as illustrated. The opening 11 and the slits 12 and 13 are punched in the structure and constitute the first step in preparing said structure for the reception of the fastening device.

After the structure has been prepared as just stated, the portion of the metal structure between the slits 12 and 13 is bossed out of the normal plane of the structure 10. In the operation of bossing the portion 14 out of the plane of the metal structure, openings in planes normal to the structure are provided by the slits 12 and 13 permitting the fastening device to be passed beneath the portion 14. The structure is then ready for the reception of the fastening device.

Figures 6, 6A:
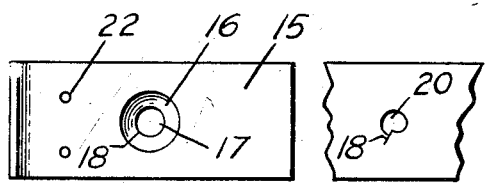
Figures 6 and 7 are respectively plan and edge views of the fastening device included in Figures 4 and 5.
Figure 6A is a fragmentary detail view of the blank from which the fastening device is formed.
Figure 7:
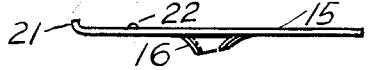

The fastening device shown in detail in Figures 6 and 7 consists of an elongated strip of sheet metal 15. Preferably the metal of which the strip 15 is constructed is of heavier gage than that of the structure 10, whereby a stronger thread may be provided for engagement by the screw or bolt. The strip 15 is provided with a conical protuberance having an opening 17 in the top thereof. A slit 18 extends radially of the opening 17. The wall of the opening 17 is shaped so that it is of helical form providing a thread for the screw or bolt. In the final form the opening is of the same diameter and shape as the shank of the screw or bolt at the base of the thread. Prior to the formation of the conical protuberance the opening in the strip 15 is much smaller and of irregular outline as illustrated at 20 in Figure 6A, which shows a fragment of the strip provided with the necessary opening prior to the formation of the conical protuberance by a die-shaping operation. The formation of the thread in the wall of the opening 17 is practiced in a manner pointed out in further detail in the copending application of B. C. Place, Serial No. 87,292, filed June 25, 1936 Patent 2,081,065 of May 18, 1937.

Strip 15 also includes an upturned portion 21 at one end providing a finger hold facilitating the insertion of the strip into assembled relation with the sheet metal structure 10, and one or more bosses or projections 22 constituting stops positioning the strip when the opening 17 therein is in alignment with the opening 11 in the structure.

Figure 4:
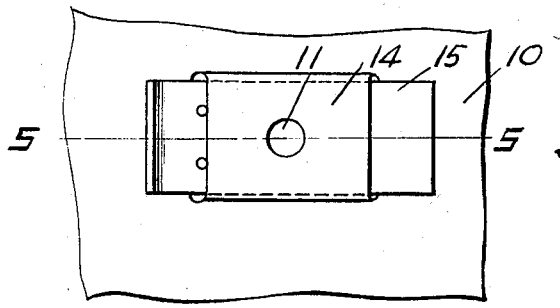
Figure 4 is a fragmental plan view of the sheet metal structure, the fastening device being assembled with relation to said structure.

The strip 15 is assembled or interlocked with the sheet metal structure 10 by inserting the end at the right of Figure 6 through the wide slit 13, said slit being of sufficient width to permit the passage of the conical protuberance 16. Preferably this strip is inserted at an acute angle to the plane of the sheet metal structure 10 until the conical protuberance 16 has been passed through the slit 13. The strip is then brought into parallelism with the structure 10 and passed through the slit 12 until strip 15 is disposed in the position indicated in Figures 4 and 5. It is moved until the stops 22 contact with the wall of embossed portion 14, in which position the opening 17 in the strip is aligned with the opening 11 in the sheet metal structure.

Figure 5:
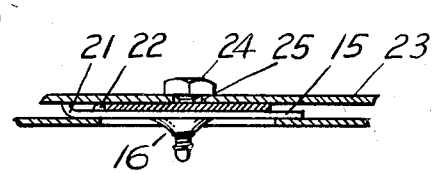
Figure 5 is a sectional view taken on the plane indicated by line 5—5 in Figure 4, the supported structure and the bolt that secures it being added thereto.

The structure 10 is thus adapted to have any other structure, such as a fender 23, secured thereto by means of a bolt 24 as illustrated in Figure 5, the fender 23 being provided with an opening 25 through which the threaded shank of the bolt passes, securing the fender 23 to the body 10. The shank of the bolt is also passed through the opening 11 and into threaded engagement with the thread provided by the wall of the opening in the conical protuberance 17. The bolt is threaded through said opening and drawn taut, the final movement of the bolt serving to flatten the protuberance and thus contract the opening 17 into biting engagement with the shank of the bolt at the base of the thread, as pointed out in the copending application already referred to. The contraction of the opening in the conical protuberance causes the firm gripping of the bolt by the metal of the strip 15 thus preventing reverse movement of the bolt. A self-locking thread is thus provided and the thread is of great strength inasmuch as the strip 15, as already stated, may be constructed of thicker metal or metal of a higher grade than that from which the structure 10 is made.

Figure 8:
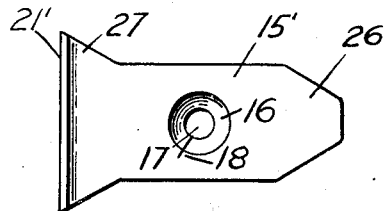
Figure 8 is a plan view of a modified form of invention.

In the modification of the invention illustrated in Figure 8, a strip 15' is provided, the ends 26 and 27 of which are trapezoidal in form, the arrangement being such as to provide a narrowing taper adjacent one end and a widening taper adjacent the other end. The widening taper is provided at the end that contains a finger hold 21' to facilitate insertion of the strip after the manner of a latch. The body of the strip is provided with a conical protuberance 16 having an opening 17 in the top thereof and a slit 18 of the character included in the strip illustrated in Figures 6 and 7.

Figure 9:
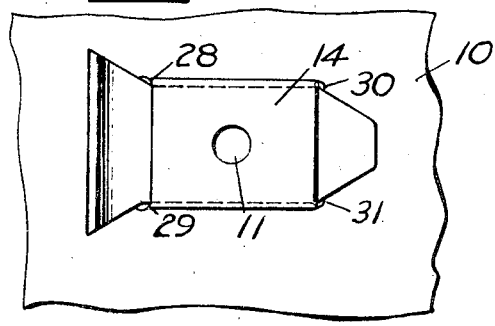
Figure 9 is a fragmental plan view showing the application of the form of the invention illustrated in Figure 8 to the sheet metal structure.

The strip of Figure 8 is applied to a metal structure 10 as illustrated in Figure 9, the taper at the ends of the strip serving to provide the stop to limit the movement of the strip to a position at which the opening 17 aligns with the opening 11 in the structure 10. In addition the tapered ends serve to provide a substantial seal at the points 28, 29, 30 and 31 of Figure 9, thus minimizing the entrance of moisture in the structure when this is of importance, as when the structure 10 constitutes a part of an automobile body, for example.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A device designed for engagement by a threaded element, comprising an elongated flat strip of metal having a split conical protuberance formed in the body thereof, an opening in said protuberance the wall of which is shaped to provide a thread, the body of said strip having trapezoidal extensions at both ends of said strip.

2. A device designed for engagement by a threaded element, comprising an elongated flat strip of metal having a split conical protuberance formed in the body thereof, an opening in said protuberance the wall of which is shaped to provide a thread, said body having a narrowing taper adjacent one end and a widening taper adjacent the other end.

3. A sheet metal structure adapted to receive a threaded fastener, comprising a portion of the metal structure pressed out of the normal plane thereof, slits adjacent the ends of said portion and an opening between said slits for the passage of the fastener, and a device in the form of an elongated strip passed through said slits, said device including a conical protuberance having an opening in the top thereof the wall of which provides a thread for said fastener, the opening in said device being aligned with the opening in said portion.

4. The combination defined in claim 3 including stop means on said strip located to abut against a part of said structure adjacent one of said slits when said openings are aligned.

5. The combination defined in claim 3 in which said strip is tapered at the points at which it engages the walls of said slits whereby said slits are sealed by the strip.

6. A sheet metal structure adapted to receive a threaded fastener having a portion thereof containing an opening for a fastener pressed out of the normal plane of said metal and a pair of aligned slits in said portion, and a strip of metal having an opening forming a thread for engagement by said fastener, said strip being passed through said slits.

7. The method of providing a sheet metal structure with a thread for a screw, which consists in punching a fastener opening and two slits in said structure, bossing the metal so that said slits are disposed in planes normal to said structure, and then passing a sheet metal strip having a threaded opening through said slits until said openings align with each other.

8. A device designed for engagement by a threaded element, comprising an elongated flat strip of metal having a split conical protuberance formed in the body thereof, an opening in said protuberance the wall of which is shaped to provide a thread, and means on said strip to serve as a stop when the strip is slid through holes in a sheet metallic structure and said opening is aligned with an opening in said structure, said last named means comprising a widened part of the strip of uniformly increasing width.

H. W. KOST.